United States Patent
Nguyen et al.

(10) Patent No.: US 9,607,081 B2
(45) Date of Patent: Mar. 28, 2017

(54) ONTOLOGY BASED CATEGORIZATION OF USERS

(71) Applicant: Red Hat, Inc., Raleigh, NC (US)

(72) Inventors: Filip Nguyen, Brno (CZ); Filip Eliáš, Vysni Lhoty (CZ)

(73) Assignee: Red Hat, Inc., Raleigh, NC (US)

( * ) Notice: Subject to any disclaimer, the term of this patent is extended or adjusted under 35 U.S.C. 154(b) by 264 days.

(21) Appl. No.: 14/081,873

(22) Filed: Nov. 15, 2013

(65) Prior Publication Data

US 2015/0142828 A1    May 21, 2015

(51) Int. Cl.
*G06F 17/30* (2006.01)

(52) U.S. Cl.
CPC ............... *G06F 17/30734* (2013.01)

(58) Field of Classification Search
None
See application file for complete search history.

(56) References Cited

U.S. PATENT DOCUMENTS

| | | | |
|---|---|---|---|
| 8,005,680 B2 | 8/2011 | Kommer | |
| 8,359,191 B2 | 1/2013 | Chen et al. | |
| 8,856,670 B1* | 10/2014 | Thakur | G06F 3/048 715/747 |
| 9,032,328 B1* | 5/2015 | Kilat | G06F 8/315 715/744 |
| 2002/0143643 A1* | 10/2002 | Catan | G06Q 30/06 235/375 |
| 2003/0005412 A1 | 1/2003 | Eanes | |
| 2004/0103296 A1* | 5/2004 | Harp | G06F 21/55 726/22 |
| 2008/0040473 A1* | 2/2008 | Larsson | G06F 17/30896 709/224 |
| 2009/0327482 A1* | 12/2009 | Malhotra | G06F 15/173 709/224 |
| 2011/0154216 A1* | 6/2011 | Aritsuka | G06F 9/44505 715/745 |
| 2012/0036126 A1 | 2/2012 | Kawamura et al. | |
| 2012/0102304 A1* | 4/2012 | Brave | G06F 17/30867 713/1 |

(Continued)

OTHER PUBLICATIONS

Bellwood et al. "SOA—Repository Artifact Model and Protocol Specification (S-RAMP) Atom Binding," Revision 0.9, Apr. 21, 2010, pp. 1-83.*

(Continued)

*Primary Examiner* — Richard Bowen
(74) *Attorney, Agent, or Firm* — Haynes and Boone, LLP

(57) ABSTRACT

Systems and methods are disclosed for categorizing a user. An example method includes marking one or more graphical user interface (GUI) features of an application. The method also includes monitoring a user's usage of the one or more marked GUI features of the application. The method further includes generating one or more user-specific ontologies for the user in accordance with the user's monitored usage. The method also includes comparing the one or more user-specific ontologies with a plurality of defined ontologies. Each defined ontology corresponds to a category of a plurality of categories. The method further includes categorizing the user in accordance with the comparison of the one or more user-specific ontologies and the plurality of defined ontologies.

20 Claims, 5 Drawing Sheets

(56) References Cited

U.S. PATENT DOCUMENTS

| | | | | |
|---|---|---|---|---|
| 2012/0117006 A1* | 5/2012 | Sathish | ............... | G06F 11/3072 706/12 |
| 2012/0143694 A1* | 6/2012 | Zargahi | .............. | G06Q 30/0603 705/14.66 |
| 2012/0303356 A1 | 11/2012 | Boyle et al. | | |
| 2013/0031470 A1* | 1/2013 | Daly, Jr. | ........... | G06F 17/30893 715/243 |
| 2013/0103640 A1* | 4/2013 | Rehman | ............. | G06Q 30/0232 707/609 |

OTHER PUBLICATIONS

Kreger et al. "The IBM advantage for SOA reference architecture standards," IBM developerWorks, Jan. 17, 2012, pp. 1-21.*

Alexander Maedche, et al, Clustering Ontology-Based Metadata in the Semantic Web, FZI Research Center for Information Technologies at the University of Karlsruhe, Research Group WIM, retrieved Nov. 15, 2013 from http://www.valentinzacharias.de/papers/clustering.pdf, pp. 348-360.

Harith Alani et al, Automatic Ontology-Based Knowledge Extraction from Web Documents, Natural Language Processing, retrieved Nov. 15, 2013 from http://eprints.soton.ac.uk/257396/, pp. 14-21, Published by the IEEE Computer Society, 2003.

Horacio Saggion et al., Ontology-Based Information Extraction for Business Intelligence; Department of Computer Science, University of Sheffield, retrieved Nov. 15, 2013 from http://iswc2007.semantieweb.org/papers/837.pdf, pp. 843-856, Copyright Springer-Verlag, Berlin Heidelberg 2007.

Christiaan Fluit et al., Ontology-Based Information Visualization: Toward Semantic Web Applications, retrieved Nov. 15, 2013 from http://citeseerx.ist.psu.edu/viewdoc/summary?doi=10.1.1.81.5842. pp. 45-58.

Diana Maynard et al., Ontology-Based Information Extraction for Market Monitoring and Technology Watch, Department of Computer Science, University of Sheffield, UK, retrieved Nov. 15, 2013 from http://www.ontotext.com/sites/default/files/publications/htechsight.pdf, pp. 1-10.

* cited by examiner

ONTOLOGY BASED CATEGORIZATION OF USERS

BACKGROUND

The present disclosure generally relates to categorizing users, and more particularly to categorizing users based on ontologies.

The increase in use of the Internet has resulted in a growing demand for websites to track their online customers' behavior and activity while at their sites. Tracking this activity enables the website to better understand their customers, which provides insight into ways in which the websites' service and/or offerings can be improved.

BRIEF SUMMARY

This disclosure relates to categorizing users. Methods, systems, and techniques for categorizing users based on ontologies are provided.

According to an embodiment, a method of categorizing a user includes marking one or more graphical user interface (GUI) features of an application. The method also includes monitoring a user's usage of the one or more marked GUI features of the application. The method further includes generating one or more user-specific ontologies for the user in accordance with the user's monitored usage. The method also includes comparing the one or more user-specific ontologies with a plurality of defined ontologies. Each defined ontology corresponds to a category of a plurality of categories. The method further includes categorizing the user in accordance with the comparison of the one or more user-specific ontologies and the plurality of defined ontologies.

According to another embodiment, a system for categorizing a user includes a monitor that marks one or more graphical user interface (GUI) features of an application and monitors a user's usage of the one or more marked GUI features of the application. The system also includes an ontology generator that generates one or more user-specific ontologies for the user in accordance with the user's monitored usage. The system further includes a categorizer that compares the one or more user-specific ontologies with a plurality of defined ontologies and categorizes the user in accordance with the comparison of the one or more user-specific ontologies and the plurality of defined ontologies. Each defined ontology corresponds to a category of a plurality of categories.

According to another embodiment, a non-transitory machine-readable medium includes a plurality of machine-readable instructions that when executed by one or more processors are adapted to cause the one or more processors to perform a method including: marking one or more graphical user interface (GUI) features of an application; monitoring a user's usage of the one or more marked GUI features of the application; generating one or more user-specific ontologies for the user in accordance with the user's monitored usage; comparing the one or more user-specific ontologies with a plurality of defined ontologies, each defined ontology corresponding to a category of a plurality of categories; and categorizing the user in accordance with the comparison of the one or more user-specific ontologies and the plurality of defined ontologies.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Embodiments of the present disclosure and their advantages are best understood by referring to the detailed description that follows.

DETAILED DESCRIPTION

I. Overview
II. Example System Architecture
  A. Collection of Information About a User's Sessions
  B. Generate Ontologies Specific to the User
  C. Categorize Owners of User-Specific Ontologies
III. Example Method
IV. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Application providers may be interested in who is using their application and how it is being used. Information that is collected and extracted about application users may be used by application providers to offer services or products that are targeted to users more likely to purchase or accept the offerings. It may be desirable to categorize a group of application users and store this categorization (may be viewed as a metadata) in a format that is suitable for any modern design time repository.

According to an embodiment, a method of categorizing a user includes marking one or more graphical user interface (GUI) features of an application. The method also includes monitoring a user's usage of the one or more marked GUI features of the application and generating one or more user-specific ontologies for the user in accordance with the user's monitored usage. The method also includes comparing the one or more user-specific ontologies with a plurality of defined ontologies. Each defined ontology corresponds to a category of a plurality of categories. The method further includes categorizing the user in accordance with the comparison of the one or more user-specific ontologies and the plurality of defined ontologies.

II. Example System Architecture

Figure 1:
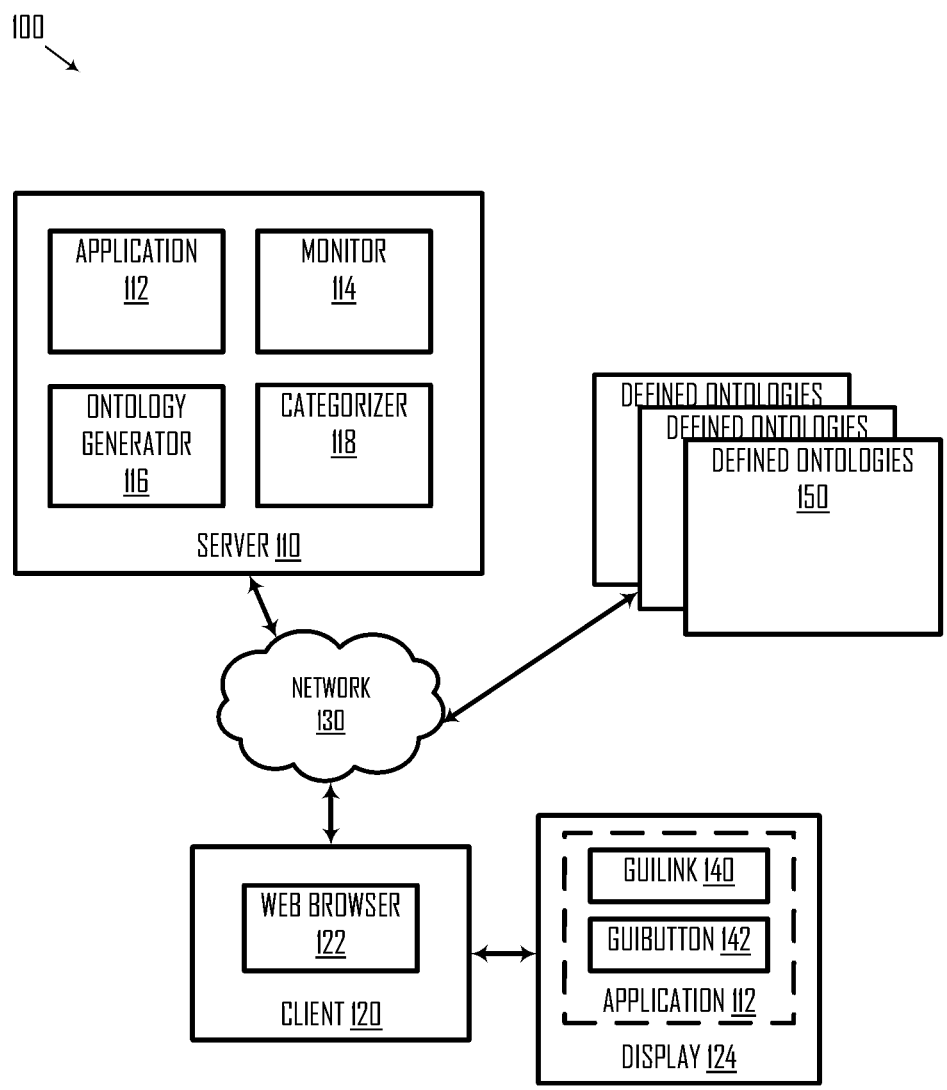
FIG. 1 is a block diagram illustrating a system for categorizing a user, according to an embodiment.

FIG. 1 is a block diagram 100 illustrating a system for categorizing a user, according to an embodiment. Diagram 100 includes a server 110 and client 120 coupled over a network 130. Network 130 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Server 110 may be in communication (via network 130) with one or more clients 120. Server 110 may provide interaction with an application 112 to one or more clients 120 and collect and extract metadata about users of application 112. In an example, application 112 is a web application that is provided over the Internet and offers a service to a user. Server 110 may host a website, and application 112 may include one or more webpages that can be remotely rendered by a web browser 122 that is resident on client 120.

Application 112 may use one or more graphical user interface (GUI) features to interact with the user. Examples of a GUI include a link, button, image, and webpage. GUILink 140, GUIButton 142 receives and/or displays information to a user. Client 120 is coupled to a display 124 that displays GUILink 140, GUIButton 142 of application 112. A user may navigate application 112 by selecting a GUI displayed on a webpage, and selecting the GUI may take the user to another webpage that displays one or more GUIs. For brevity, application 112 may be described as a web application, but it should be understood that application 112 may be any application (e.g., accessed via an intranet and/or downloaded at client 120 and used via a standalone work station) that uses one or more GUI features to interact with the user.

An application session may refer to a mechanism to track a user's interaction with the application. Application 112 may use sessions to identify the stream of requests generated by each individual user amid the requests from other users who are also connected to application 112 at the same time. In an embodiment, server 110 collects data about the user's session activity (e.g., user's selection of GUIs of application 112) and generates a user-specific ontology in accordance with the collected data. An ontology may refer to a graph that includes data that can be gathered and organized into categories. The graph may include vertices corresponding to the actions performed by the user (e.g., selection of a GUI) and may also include edges corresponding to a sequence in which the actions were performed. A vertex in a graph may also be referred to as a node. The user-specific ontology may represent the user's behavior in his or her interaction with application 112 from session to session. For example, the user may start a session with application 112, navigate application 112 by selecting one or more GUIs of application 112, and then end the session. In such an example, the user-specific ontology may include a first node representing the start of the session and an edge from the first node to another node representing a GUI selected by the user, and further edges connecting a node to another node representing subsequent GUIs selected by the user, and so on until the user ends the session, and an edge connecting the node representing the last GUI selected by the user to a node that represents the end of the session. Server 110 generates user-specific ontologies for a plurality of application users and associates as the owner of a user-specific ontology the user for whom the user-specific ontology was generated.

FIG. 1 also includes a plurality of defined ontologies 150. Each defined ontology corresponds to a category of a plurality of categories that a user may fall within. The plurality of categories that are defined may depend on the type of website being used. The website provider may define these categories. In an example, a user may use a website that offers information, products, and services to manage Java® applications and services, and users of this website may fall within three categories that identify the user's experience level. The three experience level categories may include, for example, an Enterprise Application Platform (EAP) enthusiast, EAP expert, and Service-Oriented Architecture (SOA) expert. In another example, a user may use a website that sells shoes, and users of this website may fall within four categories that identify the user's personality. The four personality categories may include, for example, athletic (e.g., from viewing running or hiking shoes or cleats), social (e.g., from viewing pumps that are greater than three inches, booties, or dressy shoes), relaxed (e.g., from viewing thongs or other types of sandals), and workaholic (e.g., from viewing work pumps that are less than three inches).

Each category is associated with a defined ontology that represents "typical" behavior for a user falling within that particular category. In an example, typical behavior for an EAP enthusiast may include erratic browsing of "Getting Started" guide use cases, and a defined ontology for an EAP enthusiast may include data representing erratic browsing of "Getting Started" guide use cases. Accordingly, an owner of a user-specific ontology that is highly similar to the defined EAP enthusiast ontology may most likely fall within the EAP enthusiast category. Similarly, typical behavior for an EAP expert may include features browsing of the latest release notes of EAP, and a defined ontology for an EAP expert may include data representing features browsing of the latest release notes of EAP. Accordingly, an owner of a user-specific ontology that is highly similar to the defined EAP expert ontology may most likely fall within the EAP expert category. Similarly, typical behavior for an SOA expert may include feature browsing release notes and news about integration technologies that are published on the website, and a defined ontology for an SOA expert may include data representing feature browsing release notes and news about integration technologies that are published on the website. Accordingly, an owner of a user-specific ontology that is highly similar to the defined SOA expert ontology may most likely fall within the SOA expert category.

The defined ontology may be generated in a variety of ways. In an example, the defined ontology is generated by hand and input into the system by an administrator. In such an example, the administrator may have special knowledge about application 112 and its offerings. The administrator may store the defined ontology having nodes and edges into the system. In another example, one or more sessions of a user considered to be a typical user falling within a particular category may be recorded and used as the defined ontology for that particular category.

Server 110 may compare a user-specific ontology with a plurality of defined ontologies and categorize the owner of the user-specific ontology in accordance with the comparison. Providers of application 112 may then be better suited to analyze how users are using application 112. For example, the application provider may supply this information to the marketing department to further enhance sales and pique interest in products and services in which owners categorized as being within a particular category have a higher probability of being interested.

Figure 2:
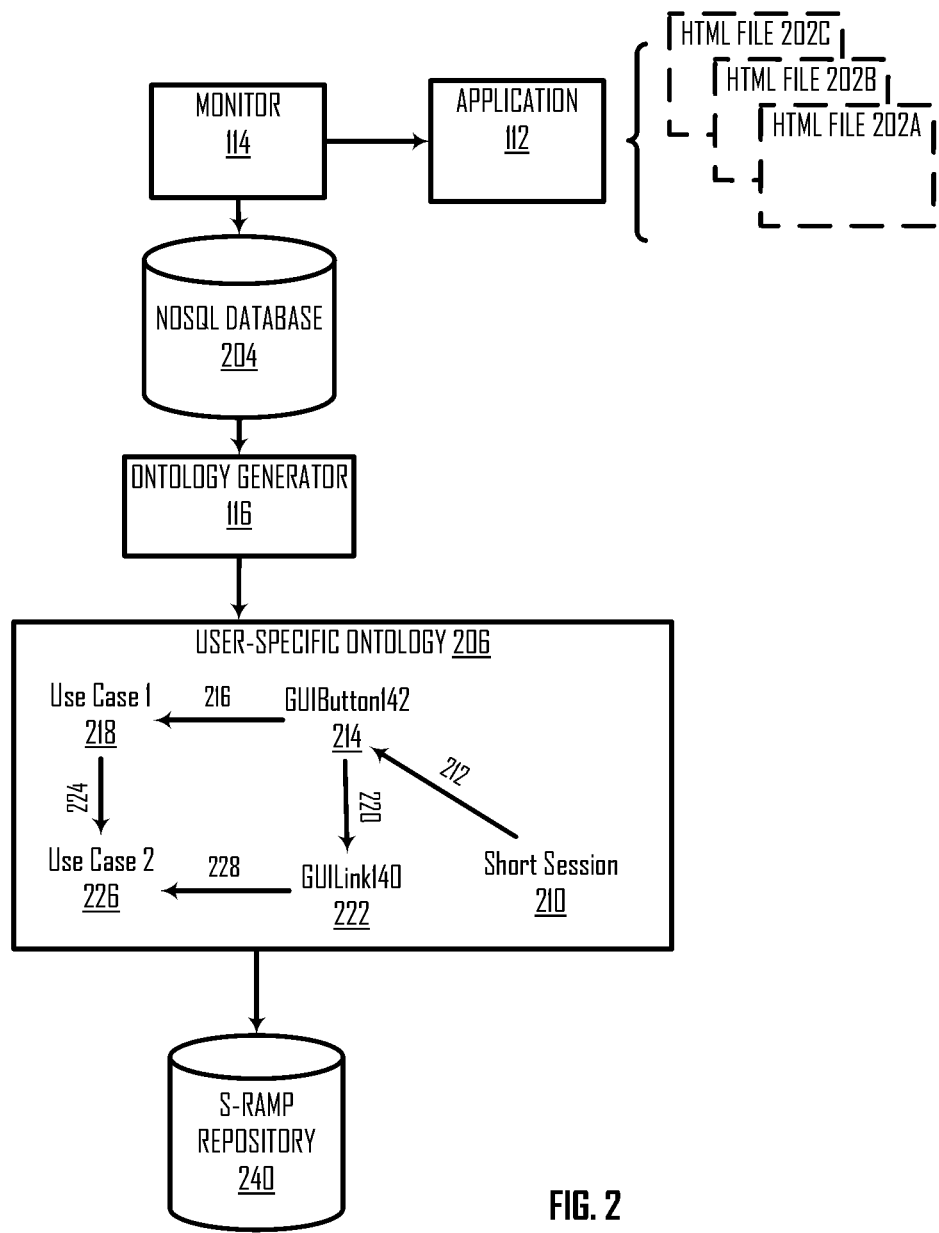
FIG. 2 is a flow diagram illustrating the categorization of an application user, according to an embodiment.

Server 110 includes a monitor 114, ontology generator 116, and categorizer 118. Monitor 114, ontology generator 116, and categorizer 118 are further described in relation to FIG. 2. FIG. 2 is a flow diagram illustrating the categorization of an application user, according to an embodiment.

A. Collection of Information about a User's Sessions

Application 112 may use web documents written in a markup language such as hypertext markup language (HTML) or extensible HTML (XHTML). In FIG. 2, application 112 includes HTML files 202A-202C. HTML indicates a structure and format that is applied to a text-based document, which is primarily intended to be displayed by a web browser. HTML is made up of a series of tags that surround content, and contain structural and formatting information that defines how the document should be understood and displayed. In an example, when web browser 122 receives HTML from server 110, web browser 122 parses the HTML and applies some styling and formatting to the document for display based on the instructions in the tags.

Monitor 114 may semantically mark a web document (e.g., webpage) with an attribute that enables the user's navigation of application 112 to be monitored. In an embodiment, monitor 114 marks one or more graphical user interface (GUI) features of application 112 and monitors a user's usage of the one or more marked GUI features during one or more sessions. In an example, monitor 114 marks a GUI feature of application 112 by modifying an HTML file of application 112. Monitor 114 may modify one or more HTML files of application 112 by inserting an attribute for the GUI feature in the respective HTML file. The attribute may enable monitor 114 to monitor usage of the particular GUI feature. Although a file written in HTML is described as being modified, it should be understood that a file written in any language that enables a GUI feature of the application to be identified and its usage monitored is within the scope of the disclosure. For example, another embodiment may use XML files.

Table A illustrates an example modification that marks GUILink 140 of HTML file 202A. In the example illustrated in Table A, GUILink 140 is a link in application 112, and monitor 114 inserts an attribute "ontologyClass" and an attribute value "GUILink140" into the appropriate link element of the HTML file.

TABLE A

...
<a herf="link" ontologyClass="GUILink140"/>
...

Table B illustrates an example modification that marks GUIButton 142 of HTML file 202B. In the example illustrated in Table B, GUIButton 142 is a button in application 112, and monitor 114 inserts the attribute "ontologyClass" and an attribute value "GUIButton142" into the appropriate button element of the HTML file.

TABLE B

...
<a herf="button" ontologyClass="GUIButton142"/>
...

The marked ontology class tags may be leveraged to track the user's interaction with application 112. Table C illustrates an example of the concepts of interest to server 110. Table C includes the concept of a use case, GUI feature, and session length. The concepts in Table C are not intended to be limiting and other embodiments that include more, different, and fewer concepts are within the scope of the disclosure.

TABLE C

| Use Cases | GUI features | Session Length |
|---|---|---|
| UC1 | GUILink 140 | Short Session |
| UC2 | GUIButton 142 | Medium Session |
| UC3 | Browser redirect1 | Long Session |

Monitor 114 may monitor the user's navigation of application 112 to and from different use cases and marked GUI features, and further take note of the user's session length. In an example, monitor 114 monitors the occurrence of an action (e.g., session start of application 112, session end of application 112, or selection of a GUI feature) and a time at which the particular action occurred.

Table D illustrates an example of the activities monitored and recorded by monitor 114.

TABLE D

| Time | Action |
|---|---|
| 11400 | Application 112 opened |
| 11450 | GUIButton 142 |
| 11525 | UC1 activated |
| 11550 | Application 112 closed |

The collection of the record tuples in the example illustrated in Table D may be performed using various methods. In an example, a case activation event may be collected directly in the web framework (e.g., as the user performs the action). In such an example, when the user selects GUIButton 142, the record tuple is collected and stored. In another example, a case activation event (e.g., application closing) may be detected by the execution of particular JavaScript in web browser 122. Monitor 114 may record the activities that it has monitored (e.g., the times and actions in Table D) into a database 204. In an example, monitor 114 monitors the user's usage and records a start time that the user started and ended the application session. Monitor 114 may also monitor and record the selected GUI features and use cases activated by the user during his or her application session.

For example, monitor 114 may store the information about the user's sessions (along with information about other users' sessions) into database 204. In an example, database 204 stores records about the user's session, such as records indicating that during an application session, the user selected GUIButton 142, activated use case 1 by selecting GUILink 140, and then closed the application, ending the application session. Database 204 may be a shared database 204 that is accessible over network 130 or may be stored at server 110. It may be beneficial to use a database that provides a flexible schema-less data model, linear scalability, and high availability without compromising performance. In the example diagram illustrated in FIG. 2, database 204 is a NoSQL database. Examples of NoSQL databases include Apache Cassandra™, Dynamo™, Hibari™, and Riak™. Other embodiments that use a database different from a NoSQL database are also within the scope of the disclosure.

B. Generate Ontologies Specific to the User

In an embodiment, ontology generator 116 generates one or more user-specific ontologies for the user in accordance with the user's monitored usage. An ontology represents the user's interaction with application 112 in one or more sessions. Database 204 may store an ordered list of the user's navigation of application 112 pertaining to one or more sessions. Ontology generator 116 may extract the session data (e.g., time and actions illustrated in Table D) from database 204 and generate a user-specific ontology 206 in accordance with the session data. Ontology generator 116 may associate as the owner of a user-specific ontology the user for whom the user-specific ontology was generated.

A user may log into application 112 and use it for different lengths of time. The user may use application 112 differently depending on a length of the application session. For example, the user may behave differently in a short session compared to a longer session. Further, a user falling within one category may behave differently in a long session compared to another user falling within another category. It may be advantageous to classify the length of a session and generate user-specific ontologies specific to each classified session length. Accordingly, when a user-specific ontology is compared with the plurality of defined ontologies to determine which category the owner of the user-specific ontology falls within, the categorization may be more accurate.

Ontology generator 116 may determine a length of the user's session and classify the session length. A session length may be classified as, for example, a short, medium, or long session. Other classifications are within the scope of the disclosure (e.g., short-medium session or extra-long session). The classification of a short, medium, or long session may depend on the type of website being used. For example, a website that is used to download software may have a shorter session length compared to a website that is used to perform more elaborate work for the user (e.g., acts as a spreadsheet). For the website that is used to download software, a short session may be considered less than 120 seconds, a medium session may be considered 2-7 minutes, and a long session may be considered over 7 minutes. Referring to the example illustrated in Table D, the user's session length is 150 seconds (11550−11400=150), which would be considered a short session.

Ontology generator 116 may generate a user-specific ontology for each classified session. For example, ontology generator 116 may generate a first user-specific ontology for the user in accordance with the user's one or more short length application sessions, may generate a second user-specific ontology for the user in accordance with the user's one or more medium length application sessions, and may generate a third user-specific ontology for the user in accordance with the user's one or more long length application sessions. The session length may be configurable by an administrator, and the definition of what is considered a short/medium/long session is based on the configuration.

Ontology generator 116 may generate user-specific ontology 206 step-by-step by drawing an arrow between each of the actions that occurred in a session until the end of the session. To generate the user-specific ontology, ontology generator 116 may classify the length of the session and determine whether a user-specific ontology already exists for the user for the classified length of the session. When the user-specific ontology is determined to not exist for the classified length of the session, ontology generator 116 may generate a user-specific ontology for the classified length of the session. When the user-specific ontology is determined to exist for the classified length of the session, ontology generator 116 may append the user's monitored usage for the classified length of the session to the existing user-specific ontology. Accordingly, each user may have a growing ontology for each session classification, and each session that occurs may be recorded and appended to the most recently appended ontology for that user and for that particular session.

Ontology generator 116 generates user-specific ontology 206 by generating one or more edges that connect one or more vertices in accordance with the user's behavior in a session and/or from session to session. The vertices may represent the nodes (e.g., concepts) and the edges connect the nodes. The edges are illustrated as arrows in user-specific ontology 206 to indicate a sequence of GUI selections by the user of application 112. In an example, each generation of an ontology starts with the action "Application opened" and ends with "Application closed." Ontology generator 116 may obtain the first action "Application opened" (e.g., from the first row in Table D stored in database 204) and start generating a short session user-specific ontology 206 for the user. User-specific ontology 206 models how the user navigated application 112 during one or more short sessions. Ontology generator 116 may create a node short session 210, which represents that application 112 was opened. Ontology generator 116 may create a node "GUIButton142" 214 and append that along with an arrow 212 from node short session 210 to node "GUIButton142" 214 to user-specific ontology 206. Ontology generator 116 may then create a node "Use Case 1" 218 and append that along with an arrow 216 from node "GUIButton142" 214 to node "Use Case 1" 218 to user-specific ontology 206. Ontology generator 116 may then create a node "GUILink140" 222 and append that along with an arrow 220 from node "GUIButton142" 214 to node "GUILink140" 222 to user-specific ontology 206. Ontology generator 116 may then create a node "Use Case 2" 226 and append that along with an arrow 224 from node "Use Case 1" 218 to node "Use Case 2" 226 to user-specific ontology 206. Ontology generator 116 may then append an arrow 228 from node "GUILink140" 222 to node "Use case 2" 226.

As discussed, user-specific ontology 206 may be generated in accordance with one or more of the user's short sessions stored in database 204. In an example, during a short session, the user clicked a button (e.g., GUIButton 142) corresponding to node "GUIButton142" 214, which caused Use case 1 to be activated (corresponds to node "Use Case 1" 218) and introduced a link (corresponds to node "GUILink140" 222). The user may have selected GUILink 140, which caused Use case 2 to be activated (corresponds to node "Use Case 2" 226) and introduced a button. Each of the arrows may be from the same session or different sessions. For example, in FIG. 2, node "GUIButton142" 214 points to nodes "Use Case 1" 218 and "GUILink 140" 222 via arrows 216 and 220, respectively. Arrows 216 and 220 may represent the user's navigation of application 112 in the same session or different sessions. Ontology generator 116 may add arrows to existing short session user-specific ontologies. Ontology generator 116 may also generate a user-specific ontology for each of the user's classified sessions, if applicable (e.g., medium-length and/or long-length sessions).

Although three session length classifications were described, it should be understood that other embodiments having one, two, or more than three session length classifications are within the scope of the disclosure. In an embodiment in which only one session length classification is defined, ontology generator 116 may skip the determination of classifying the session length.

Ontology generator 116 may generate ontologies for users in batches. It may be beneficial to generate ontologies for users during low-peak times (e.g., after business hours or late at night) for performance reasons. In an example, a user-specific ontology is generated once a day. In such an example, when the user has two short sessions in one day, the first short session may be generated into a user-specific ontology and the second short session may be appended to the user-specific ontology for the short sessions to finally generate user-specific ontology 206.

Ontology generator 116 associates as the owner of a user-specific ontology the user for whom the user-specific ontology was generated. Ontology generator 116 may store the one or more user-specific ontologies and the association between an owner and his or her user-specific ontology to a repository 240. Accordingly, repository 240 may store the user-specific ontologies along with their owners. In an embodiment, repository 240 stores data using an ontology data model. As such, the users' session behavior may be stored using the ontology data model. In an example, repository 240 is a SOA Repository Artifact Model and Protocol (S-RAMP) repository. An S-RAMP implementation may include the S-RAMP repository (server), user interface, and command line tool. S-RAMP is a specification for artifact repository and defines a data model used by the S-RAMP repository and also a protocol to interact with it. S-RAMP provides a protocol for storing and extracting metadata from various artifacts. Artifacts stored in the S-RAMP repository may be added, deleted, and updated, and metadata may be extracted about a user.

S-RAMP is a protocol that is used in middleware and defines an ontology format based on the OWL Lite specification/format. An administrator may create a hierarchical ontology of classifiers in this format and provide that ontology to the S-RAMP repository. The administrator may classify artifacts in the repository with classifiers defined in the ontology, and the classifiers provide the administrator with a mechanism to organize the data. The S-RAMP implementation may implement a routine for storing (and possibly extracting) information about users of particular web applications. S-RAMP may then be used to track which kind of users use which parts of a web application.

The use of S-RAMP may leverage the concept of a method repository that stores information about users of application 112 and searches the storage in a specific way. It may be desirable to use a design-time repository standard like S-RAMP that stores information about application users in a repository-friendly format. The disclosure provides techniques to map the routine used to categorize users to the S-RAMP ontology model, which makes it easier to store the ontologies and categorizations in S-RAMP. Although repository 240 was described as being an S-RAMP repository, this is not intended to be limiting and repository 240 may be another repository that does not implement S-RAMP.

C. Categorize Owners of User-Specific Ontologies

An owner of a user-specific ontology may be categorized as being a member of a particular category of a plurality of categories. The categorization may be performed for each session length user-specific ontology associated with the user. In an embodiment, categorizer 118 compares the one or more user-specific ontologies with a plurality of defined ontologies. Each defined ontology may correspond to a category of the plurality of categories. Categorizer 118 may categorize the user in accordance with the comparison of the one or more user-specific ontologies and the plurality of defined ontologies.

Figure 3:
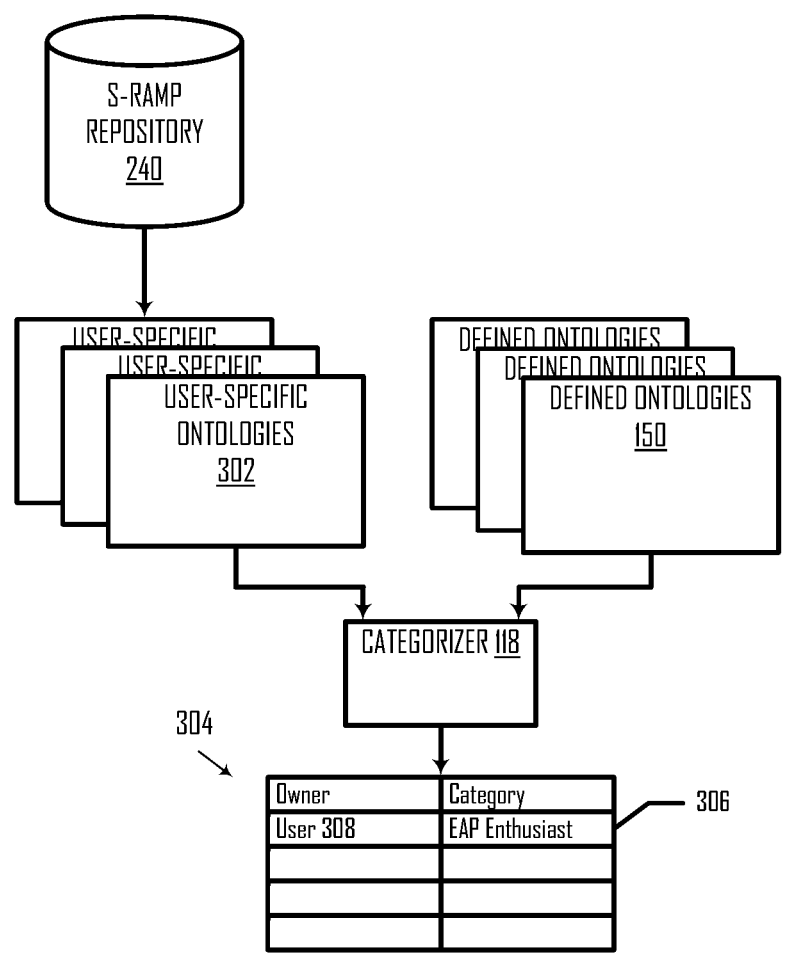
FIG. 3 is another flow diagram illustrating the categorization of the application user, according to an embodiment.

FIG. 3 is another flow diagram illustrating the categorization of the application user, according to an embodiment. In FIG. 3, one or more user-specific ontologies 302 and defined ontologies 150 are used as inputs into categorizer 118. For each user-specific ontology of the one or more user-specific ontologies 302, categorizer 118 may determine the defined ontology of defined ontologies 150 that is most similar to the respective user-specific ontology. Categorizer 118 may determine the category associated with the defined ontology that is determined to be the most similar to the respective user-specific ontology and associate the determined category with the owner of the respective user-specific ontology. Accordingly, the owner of the user-specific ontology may be placed in a category of the plurality of categories in accordance with the owner's navigation behavior when interacting with application 112.

In the example illustrated in FIG. 3, categorizer 118 may keep track of which owners have been categorized and in which categories in a table 304. Table 304 is merely an example and other embodiments in which categorizer 118 keeps track of the association between the owner and his or her determined category that are different from a table are within the scope of the disclosure. Table 304 includes an owner column and a category column. As illustrated in an entry 306 of table 304, categorizer 118 determines that the user-specific ontology corresponding to user 304 (e.g., the owner of that user-specific ontology) is most similar to the defined ontology corresponding to the EAP enthusiast category. In keeping with the above example of the three categories including an EAP enthusiast, EAP expert, and SOA expert, the user-specific ontology that is generated in accordance with user 304's interaction with application 112 is more similar to the defined ontology for the EAP enthusiast category than the defined ontologies for the EAP expert and SOA expert categories. As such, categorizer 118 may categorize user 304 as an EAP enthusiast. The marketing department may be made aware of this categorization and provide user 304 with various beginner guides to get started with and master EAP. These beginner guides are more likely to spark the interest of a user categorized as an EAP enthusiast than a user categorized as an EAP expert or SOA expert.

In an example, categorizer 118 compares one or more user-specific ontologies 302 with a plurality of defined ontologies 150 by determining a degree of similarity between a user-specific ontology of the one or more user-specific ontologies and the plurality of defined ontologies. Categorizer 118 may select a defined ontology of the plurality of ontologies having the highest degree of similarity to the user-specific ontology and categorize the user in accordance with the category corresponding to the selected defined ontology. Categorizer 118 may determine a category corresponding to the selected defined ontology and categorize the user as a member of the determined category.

The user-specific ontology includes one or more edges that connect one or more vertices, and the plurality of defined ontologies includes one or more edges that connect one or more vertices. In an example, for each defined ontology of the plurality of defined ontologies, categorizer 118 identifies a set intersection in accordance with the one or more edges and one or more vertices in the user-specific ontology and the one or more edges and one or more vertices in the respective defined ontology. A set intersection results when, for example, a vertex and one or more edges of the user-specific ontology and a defined ontology matches. For each defined ontology of the plurality of defined ontologies, categorizer 118 determines a similarity score in accordance with the identified one or more set intersections of the user-specific ontology and the respective defined ontology and selects the defined ontology that is associated with the highest similarity score. For example, a user-specific ontology may be compared to each of the defined ontologies for the EAP enthusiast, EAP expert, and SOA expert, and categorizer 118 may determine which comparison results in a higher similarity score.

According to an embodiment, categorizer 118 compares a set of one or more user-specific ontologies with a set of one or more defined ontologies, and categorizes the user in accordance with the comparison by implementing the routine in Table E.

TABLE E

INPUTS: GROUPS (set of defined ontologies); ONTOSET (set of user-specific ontologies)
OUTPUTS: tuples (owner, group)
main
    for each G(E,V) in ONTOSET // Graph(Edge, Vertex)
        for each G2(E2,V2) in GROUPS
            let SIM be a function SIM:GxG → Integer
            SIM(G,G2) := computeSimilarity(G,G2)
        for each G(E,V) in GROUPS
            return owner and graph X // X is graph that has SIM(X,G) as maximal
OUTPUTS: integer
function computeSimilarity(G(E,V), G2(E2,V2))
    result = 0
    result += |set-intersection(V,V2)|
    result += |set-intersection(E,E2)|

In the example illustrated in Table E, categorizer 118 may take two inputs including a set of one or more user-specific ontologies (ONTOSET set) and a set of one or more defined ontologies (GROUPS set). The set of one or more defined ontologies may be a set of N defined ontologies for particular categories of users, where N is a positive integer. For example, the set of defined ontologies may include the defined ontologies for an EAP enthusiast, EAP expert, and SOA expert.

The user-specific ontologies may be gathered and clustered into several disjunctive sets. In an example, the plurality of categories includes a plurality of disjunctive sets, and categorizing the user may include categorizing the user as being a member of one disjunctive set of the plurality of disjunctive sets. Categorizer 118 may categorize one or more user-specific ontologies of the set into one disjunctive set of the plurality of disjunctive sets. Categorizer 118 may group together similar users based on their user-specific ontologies. Accordingly, users may be grouped into disjunctive sets (e.g., five users are categorized as being EAP enthusiasts), and these users (e.g., EAP enthusiasts) are connected to some application session, and each session is connected to some behavior in application 112. The EAP enthusiasts may be linked to a short session. The categorization of the user may be performed for each session length user-specific ontology associated with the user. For example, if a medium-length and/or long-length session user-specific ontology exists for the user, the user may be categorized for those sessions.

As discussed above and further emphasized here, FIGS. 1-3 are merely examples, which should not unduly limit the scope of the claims. For example, it should be understood that one or more modules (e.g., monitor 114, ontology generator 116, and categorizer 118) may be combined with another module. In an example, ontology generator 116 and categorizer 118 are combined into one module. It should also be understood that a module may be separated into more than one module. In an example, ontology generator 116 is split into a first ontology generator module that generates the user-specific ontologies for a first session length and a second ontology generator module that generates the user-specific ontologies for a second session length. Further, monitor 114, ontology generator 116, and categorizer 118 may reside in the same or different computing devices.

Further, although one client and one server are illustrated in FIG. 1, other embodiments including more than one client and/or more than one server are within the scope of the present disclosure. Likewise, although three defined ontologies are illustrated, other embodiments including fewer or more than three defined ontologies are within the scope of the present disclosure.

III. Example Method

Figure 4:
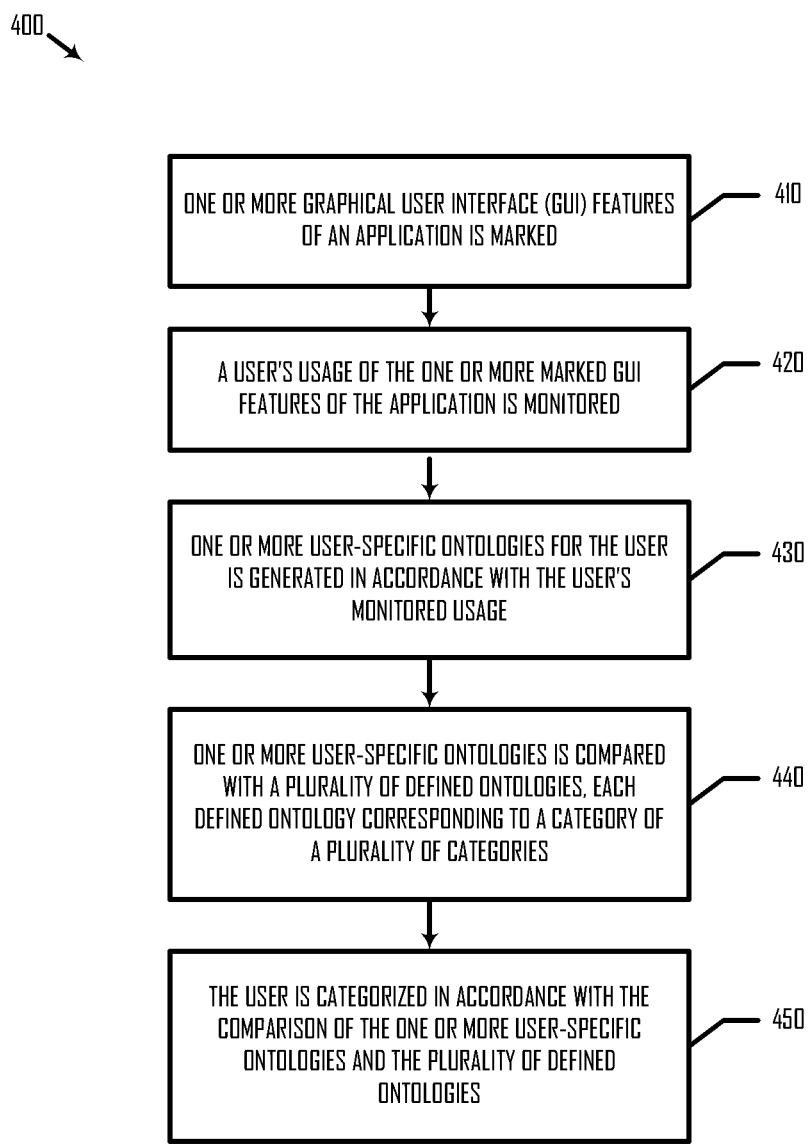
FIG. 4 is a flowchart illustrating a method of categorizing a user, according to an embodiment.

FIG. 4 is a simplified flowchart illustrating a method 400 of categorizing a user, according to an embodiment. Method 400 is not meant to be limiting and may be used in other applications.

Method 400 includes blocks 410-420. In a block 410, one or more graphical user interface (GUI) features of an application is marked. In an example, monitor 114 marks one or more graphical user interface (GUI) features of application 112. In a block 420, a user's usage of the one or more marked GUI features of the application is monitored. In an example, monitor 114 monitors a user's usage of the one or more marked GUI features of the application. In a block 430, one or more user-specific ontologies for the user is generated in accordance with the user's monitored usage. In an example, ontology generator 116 generates one or more user-specific ontologies for the user in accordance with the user's monitored usage. In a block 440, one or more user-specific ontologies is compared with a plurality of defined ontologies, each defined ontology corresponding to a category of a plurality of categories. In an example, categorizer 118 compares the one or more user-specific ontologies with a plurality of defined ontologies, each defined ontology corresponding to a category of a plurality of categories. In a block 450, the user is categorized in accordance with the comparison of the one or more user-specific ontologies and the plurality of defined ontologies. In an example, categorizer 118 categorizes the user in accordance with the comparison of the one or more user-specific ontologies and the plurality of defined ontologies.

It is also understood that additional processes may be performed before, during, or after blocks 410-450 discussed above. It is also understood that one or more blocks of method 400 described herein may be omitted, combined, or performed in a different sequence as desired.

IV. Example Computing System

Figure 5:
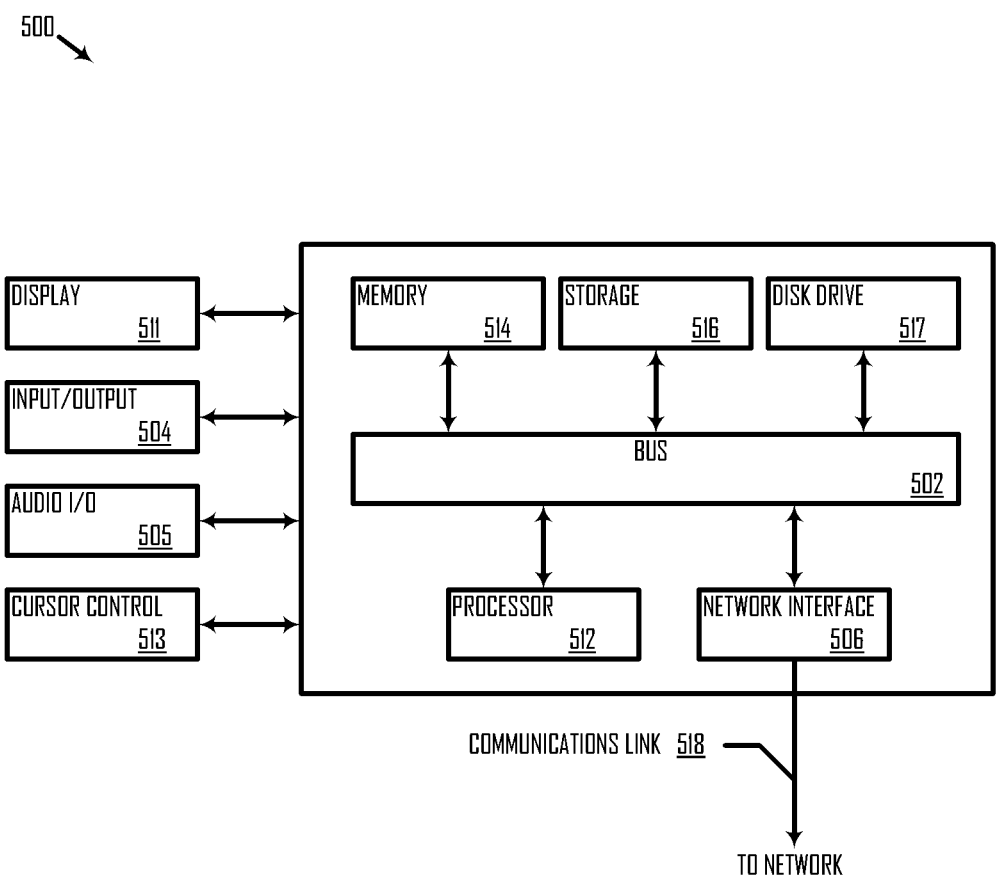
FIG. 5 is a block diagram of an electronic system suitable for implementing one or more embodiments of the present disclosure.

FIG. 5 is a block diagram of a computer system 500 suitable for implementing one or more embodiments of the present disclosure. In various implementations, application 112, monitor 114, ontology generator 116, and/or categorizer 118 may execute on computer system 500. Computer system 500 may be a client or server computing device that includes one or more processors. The computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons or links, etc., and sends a corresponding signal to bus 502. I/O component 504 may also include an output component such as a display 511, and an input control such as a cursor control 513 (such as a keyboard, keypad, mouse, etc.). An optional audio input/output component 505 may also be included to allow a user to use voice for inputting information by converting audio signals into information signals. Audio I/O component 505 may allow the user to hear audio. A transceiver or network interface 506 transmits and receives signals between computer system 500 and other devices via a communication link 518 to a network. In an embodiment, the transmission is wireless, although other transmission mediums and methods may also be suitable. A processor 512, which may be a micro-controller, digital signal processor (DSP), or other processing component, processes these various signals, such as for display on computer system 500 or transmission to other devices via communication link 518. Processor 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor 512 and other components by executing one or more sequences of instructions contained in system memory component 514. Logic may be encoded in a computer readable medium, which may refer to any medium that participates in providing instructions to processor 512 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 514, and transmission media includes coaxial cables, copper wire, and fiber optics, including wires that include bus 502. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., method 400) to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of categorizing a user, the method comprising:
    monitoring a user's usage of one or more marked graphical user interface (GUI) features of an application;
    classifying a length of one or more of a user's application sessions;
    generating one or more user-specific ontologies for the user in accordance with the user's monitored usage, wherein a user-specific ontology is represented by a graph including one or more edges connected to one or more vertices, wherein each vertex of the one or more vertices corresponds to a GUI feature selected by the user interacting with the application, and each edge of the one or more edges corresponds to a sequence of the GUI features by the user,
    wherein the generating includes for each classified length, determining whether a user-specific ontology exists for the respective classified length of the session for the user, wherein in response to a determination that the user-specific ontology exists for the respective classified length of the session, the generating further includes appending the user's monitored usage to the existing user-specific ontology for the classified length of the session, and in response to a determination that the user-specific ontology does not exist for the respective classified length of the session, the generating further includes generating a user-specific ontology for the classified length of the session;
    comparing the one or more user-specific ontologies with a plurality of defined ontologies, each defined ontology corresponding to a category of a plurality of categories; and
    categorizing the user in accordance with the comparison of the one or more user-specific ontologies and the plurality of defined ontologies.

2. The method of claim 1, wherein the marking one or more GUI features includes modifying a hypertext markup language (HTML) file of the application.

3. The method of claim 2, wherein the modifying an HTML file includes inserting an attribute for the GUI feature in the HTML file.

4. The method of claim 1, wherein the GUI feature is from a group including a link, button, image, and webpage.

5. The method of claim 1, wherein the monitoring a user's usage includes recording a start time that the user started a session of the application and recording an end time that the user ended the session of the application.

6. The method of claim 1, wherein the comparing includes determining a degree of similarity between a user-specific ontology of the one or more user-specific ontologies and the plurality of defined ontologies.

7. The method of claim 6, further including:
selecting a defined ontology of the plurality of ontologies having the highest degree of similarity to the user-specific ontology; and
determining a category corresponding to the selected defined ontology, wherein the categorizing the user includes categorizing the user as a member of the determined category.

8. The method of claim 7, wherein generating a user-specific ontology includes generating the one or more edges that connect the one or more vertices, wherein each defined ontology includes one or more edges that connect one or more vertices, and wherein the determining a degree of similarity includes for each defined ontology of the plurality of defined ontologies, identifying a set intersection in accordance with the one or more edges and one or more vertices in the user-specific ontology and the one or more edges and one or more vertices in the respective defined ontology.

9. The method of claim 8, further including:
for each defined ontology of the plurality of defined ontologies, determining a similarity score in accordance with the identified one or more set intersections of the user-specific ontology and the respective defined ontology, and wherein the selecting includes selecting the defined ontology that is associated with the highest similarity score.

10. The method of claim 1, further including:
marking the one or more GUI features of the application.

11. A system for categorizing a user, the system comprising:
a monitor that monitors a user's usage of one or more marked GUI features of an application;
a hardware memory that stores a plurality of defined ontologies;
an ontology generator that generates one or more user-specific ontologies for the user in accordance with the user's monitored usage, wherein a user-specific ontology is represented by a graph including one or more edges connected to one or more vertices, wherein each vertex of the one or more vertices corresponds to a GUI feature selected by the user interacting with the application, and each edge of the one or more edges corresponds to a sequence of the GUI features selected by the user,
wherein the ontology generator classifies a length of one or more of a user's application sessions, wherein for each classified length, the ontology generator determines whether a user-specific ontology exists for the respective classified length of the session for the user, wherein in response to a determination that the user-specific ontology exists for the respective classified length of the session, the ontology generator appends the user's monitored usage to the existing user-specific ontology for the respective classified length of the session, and in response to a determination that the user-specific ontology does not exist for the respective classified length of the session, the ontology generator generates a user-specific ontology for the respective classified length of the session; and
a categorizer coupled to the memory, wherein the categorizer compares the one or more user-specific ontologies with plurality of defined ontologies stored in the hardware memory, and categorizes the user in accordance with the comparison of the one or more user-specific ontologies and the plurality of defined ontologies, wherein each defined ontology corresponds to a category of a plurality of categories.

12. The system of claim 11, wherein the monitor modifies a hypertext markup language (HTML) file of the application.

13. The system of claim 12, wherein the monitor inserts an attribute for the GUI feature in the HTML file.

14. The system of claim 11, wherein the GUI feature is from a group including a link, button, image, and webpage.

15. The system of claim 11, wherein the monitor records a start time that the user started a session of the application and records an end time that the user ended the session of the application.

16. The system of claim 11, further including:
a database that stores the user's usage of the one or more marked GUI features; and
a repository that stores the one or more generated user-specific ontologies.

17. The system of claim 16, wherein the database is a NoSQL database.

18. The system of claim 16, wherein the repository is an S-RAMP (Service Oriented Architecture Repository Artifact Model and Protocol) repository.

19. The system of claim 11, wherein the monitor marks the one or more GUI features of the application.

20. A non-transitory machine-readable medium comprising a plurality of machine-readable instructions that when executed by one or more processors is adapted to cause the one or more processors to perform a method comprising:
monitoring a user's usage of one or more marked graphical user interface (GUI) features of an application;
classifying a length of one or more of a user's application sessions;
generating one or more user-specific ontologies for the user in accordance with the user's monitored usage, wherein a user-specific ontology is represented by a graph including one or more edges connected to one or more vertices, wherein each vertex of the one or more vertices corresponds to a GUI feature selected by the user interacting with the application, and each edge of the one or more edges corresponds to a sequence of the GUI features by the user,
wherein the generating includes for each classified length, determining whether a user-specific ontology exists for the respective classified length of the session for the user, wherein in response to a determination that the user-specific ontology exists for the respective classified length of the session, the generating further includes appending the user's monitored usage to the existing user-specific ontology for the classified length of the session, and in response to a determination that the user-specific ontology does not exist for the respective classified length of the session, the generating further includes generating a user-specific ontology for the classified length of the session;

comparing the one or more user-specific ontologies with a plurality of defined ontologies, each defined ontology corresponding to a category of a plurality of categories; and categorizing the user in accordance with the comparison of the one or more user-specific ontologies and the plurality of defined ontologies.

* * * * *